United States Patent [19]
Breland et al.

[11] Patent Number: 5,379,742
[45] Date of Patent: Jan. 10, 1995

[54] VAPORIZED FUEL INJECTION SYSTEM

[76] Inventors: Bura B. Breland, 224 Sargent St., Wiggins, Miss. 39577; Bobby L. Breland, 707 Odell, Cleburne, Tex. 76031

[21] Appl. No.: 48,316

[22] Filed: Apr. 19, 1993

[51] Int. Cl.⁶ ............................................. F02M 31/00
[52] U.S. Cl. ..................................... 123/549; 123/557
[58] Field of Search ............... 123/557, 549, 543, 546, 123/552

[56] References Cited

U.S. PATENT DOCUMENTS

| | | | |
|---|---|---|---|
| 3,762,378 | 10/1973 | Bitonti | 123/549 |
| 4,378,001 | 3/1983 | Takeda et al. | 123/549 |
| 4,665,881 | 5/1987 | Wade | 123/557 |
| 4,898,142 | 2/1990 | Van Wechem et al. | 123/549 |
| 4,909,192 | 3/1990 | Forster et al. | 123/557 |
| 5,050,569 | 9/1991 | Beunk et al. | 123/549 |

FOREIGN PATENT DOCUMENTS

| | | | |
|---|---|---|---|
| 2646069 | 4/1978 | Germany | 123/557 |
| 2925495 | 1/1981 | Germany | 123/557 |

*Primary Examiner*—Tony M. Argenbright
*Assistant Examiner*—M. Macy
*Attorney, Agent, or Firm*—E. Michael Combs

[57] ABSTRACT

An organization wherein each fuel injector includes a heat blanket secured thereabout directing heat from electrical resistance heating, exhaust pipe heating, and the like to effect heating of the fuel injector body and enhance vaporization of fuel directed into an associated combustion chamber.

3 Claims, 4 Drawing Sheets

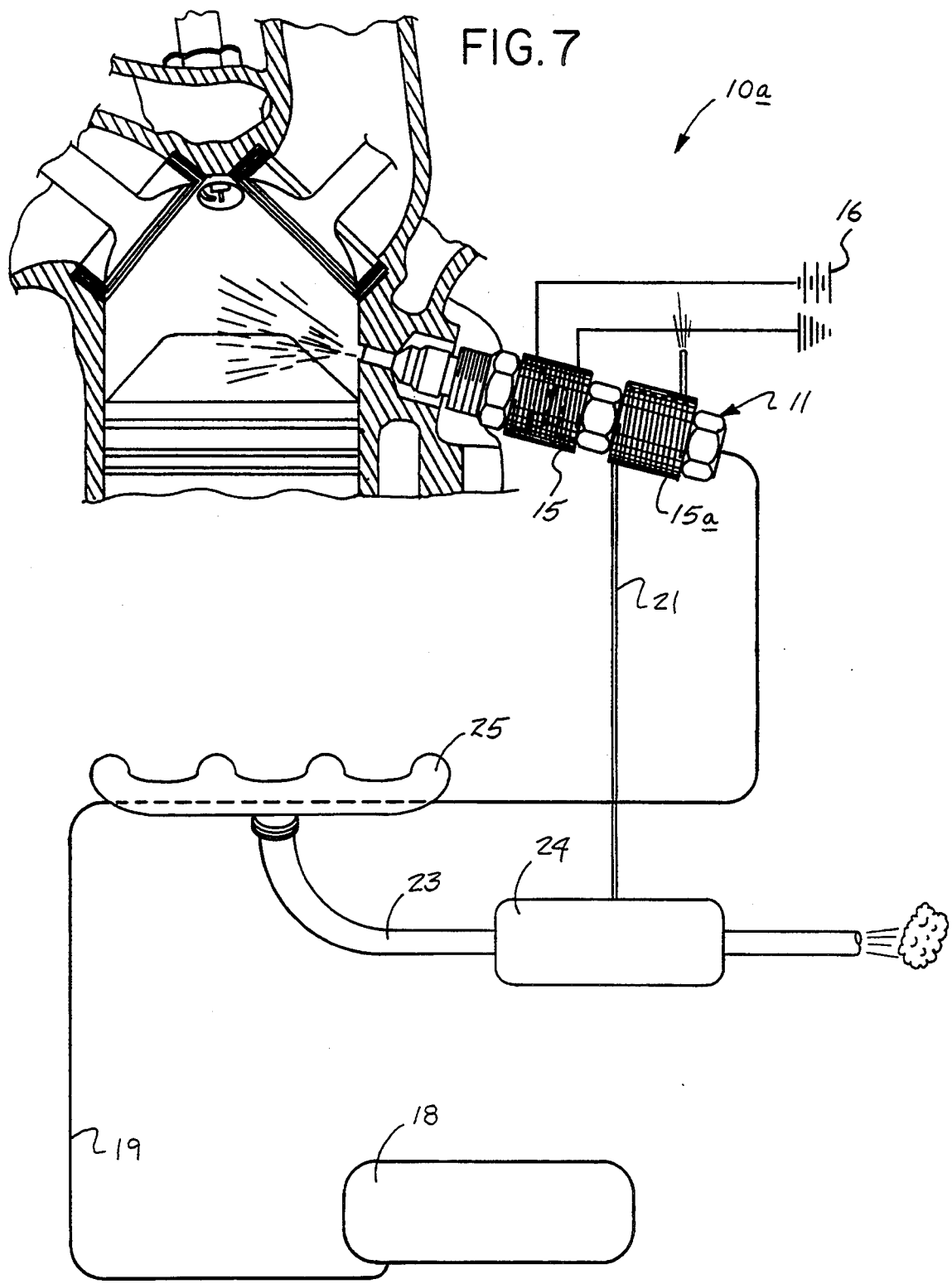

VAPORIZED FUEL INJECTION SYSTEM

BACKGROUND OF THE INVENTION

1. Field of the Invention

The field of invention relates to fuel injection apparatus, and more particularly pertains to a new and improved vaporized fuel injection system wherein the same is directed to the heating of fuel to enhance its vaporization upon its projection within an associated combustion chamber.

2. Description of the Prior Art

Various prior art injection systems are utilized such as U.S. Pat. No. 4,458,654 to Tuckney wherein heating elements are positioned subsequent to projection of fuel from an associated fuel injector body.

The instant invention attempts to overcome deficiencies of the prior art by providing for heating means arranged in surrounding relationship relative to a fuel injector body to enhance vaporization of fuel as such fuel is heated and to this extent, the present invention substantially fulfills this need.

SUMMARY OF THE INVENTION

In view of the foregoing disadvantages inherent in the known types of fuel injection apparatus now present in the prior art, the present invention provides a vaporized fuel injection system wherein the same is directed to the heating of fuel directed through a fuel injection body to enhance its vaporization within a combustion chamber. As such, the general purpose of the present invention, which will be described subsequently in greater detail, is to provide a new and improved vaporized fuel injection system which has all the advantages of the prior art fuel injection apparatus and none of the disadvantages.

To attain this, the present invention provides an organization wherein each fuel injector includes a heat blanket secured thereabout directing heat from electrical resistance heating, exhaust pipe heating, and the like to effect heating of the fuel injector body and enhance vaporization of fuel directed into an associated combustion chamber.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to unable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vaporized fuel injection system which has all the advantages of the prior art fuel injection apparatus and none of the disadvantages.

It is another object of the present invention to provide a new and improved vaporized fuel injection system which may be easily and efficiently manufactured and marketed.

It is a further object of the present invention to provide a new and improved vaporized fuel injection system which is of a durable and reliable construction.

An even further object of the present invention is to provide a new and improved vaporized fuel injection system which is susceptible of a low cost of manufacture with regard to both materials and labor, and which accordingly is then susceptible of low prices of sale to the consuming public, thereby making such vaporized fuel injection systems economically available to the buying public.

Still yet another object of the present invention is to provide a new and improved vaporized fuel injection system which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an orthographic view of the invention employing various heating surfaces relative to the fuel injection body.

DESCRIPTION OF THE PREFERRED EMBODIMENT

Figure 1:
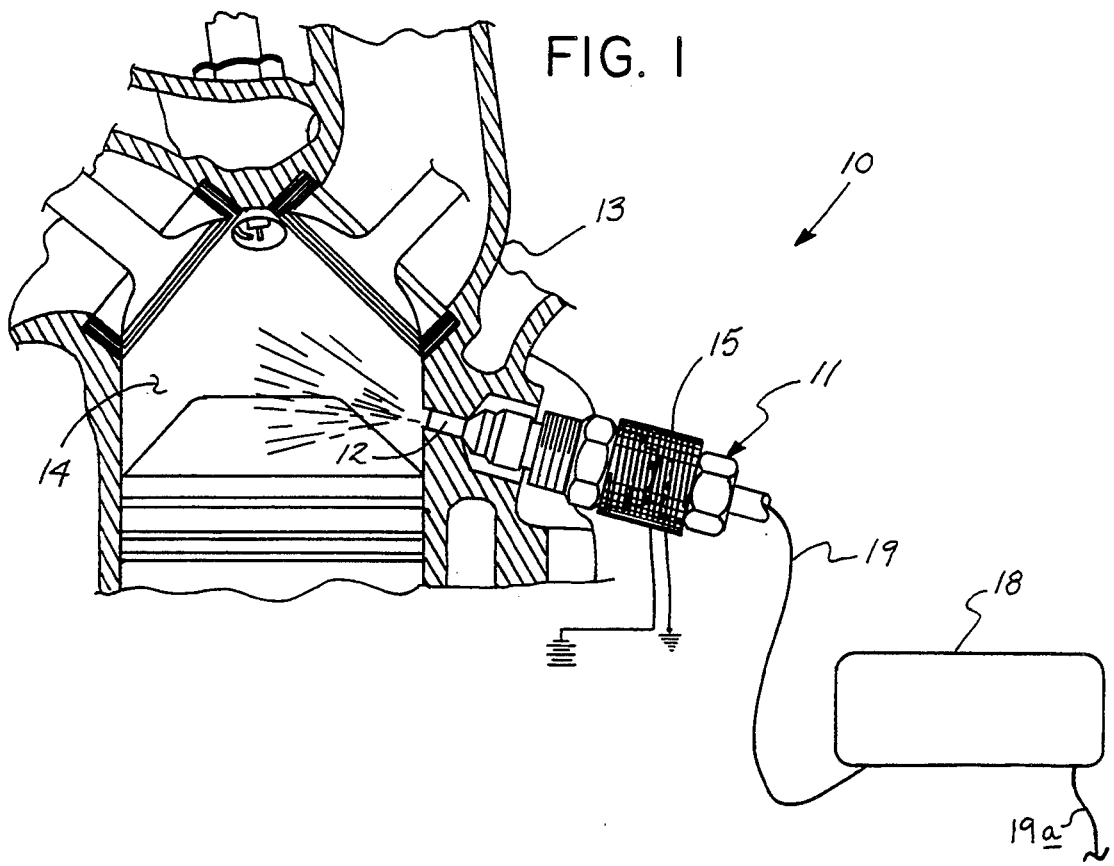
FIG. 1 is an orthographic view of the invention employing an electrical resistance heating jacket about the fuel injector body.
Figure 2:
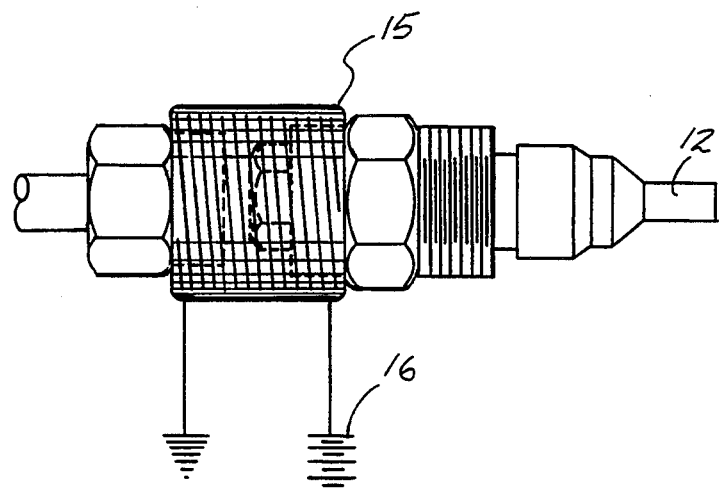
FIG. 2 is an enlarged orthographic view of the fuel injector body.

With reference now to the drawings, and in particular to FIGS. 1 to 7 thereof, a new and improved vaporized fuel injection system embodying the principles and concepts of the present invention and generally designated by the reference numeral 10 will be described.

Figure 6:
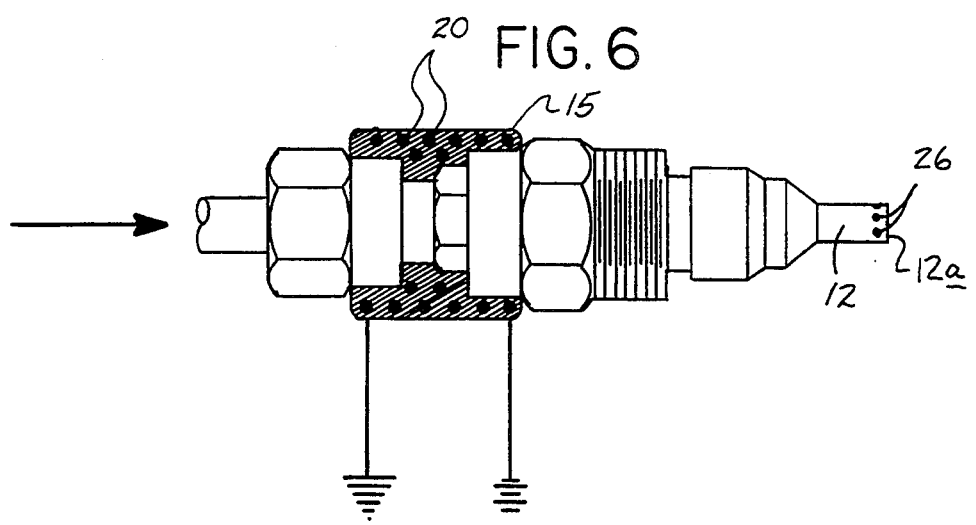
FIG. 6 is an orthographic view indicating the coil electrical resistance wires directed about the fuel injection body within the heating jacket.

More specifically, the vaporized fuel injection system 10 of the instant invention includes a fuel injector device 11 having a nozzle 12 received within a combustion chamber 14 of an associated cylinder head 13. A heating jacket 15 is mounted about the fuel injector device 11 exteriorly thereof in contiguous communication with the fuel injector device such that a vehicular battery 16 is operative to direct coiled electrical resistance cables 20 therethrough, in a manner as indicated in FIG. 6, to provide for preheating of fuel through the fuel injector body to enhance its vaporization when directed into the combustion chamber 14.

Figure 3:
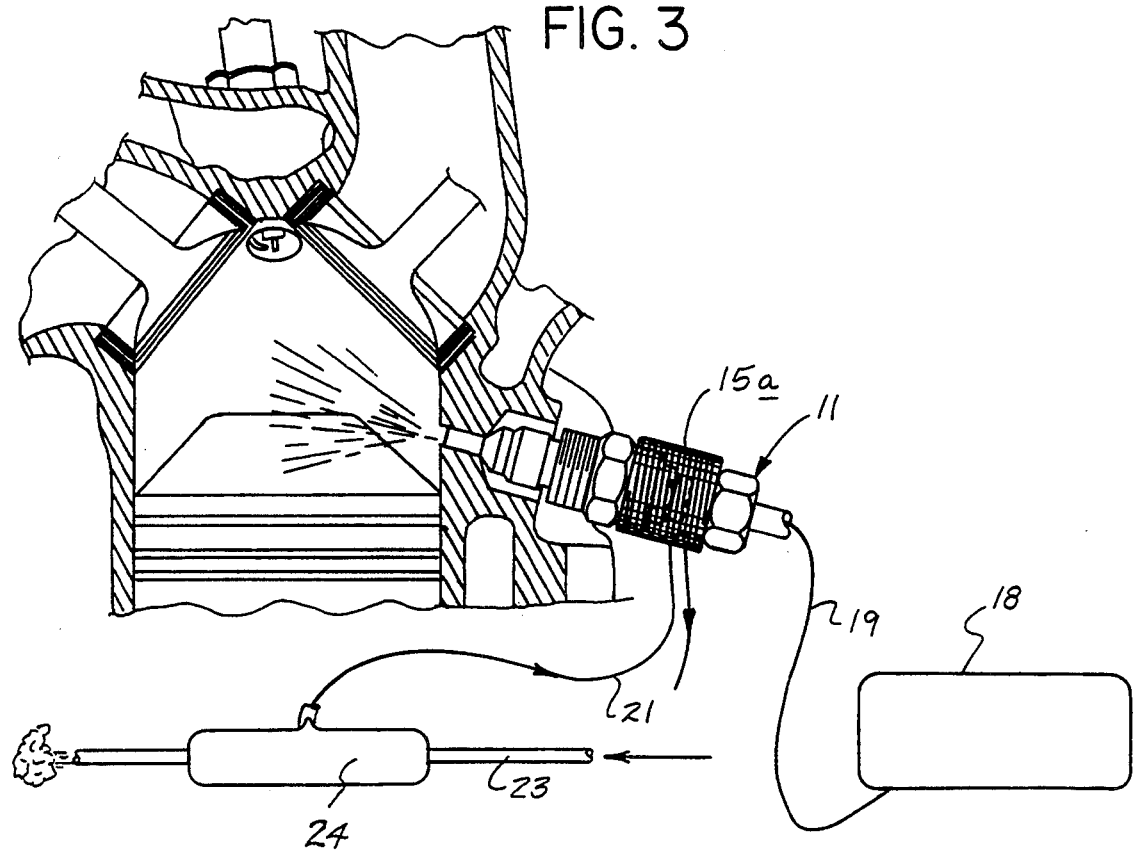
FIG. 3 is an orthographic view of the fuel injector body employing an exhaust conduit structure arranged thereabout.
Figure 4:
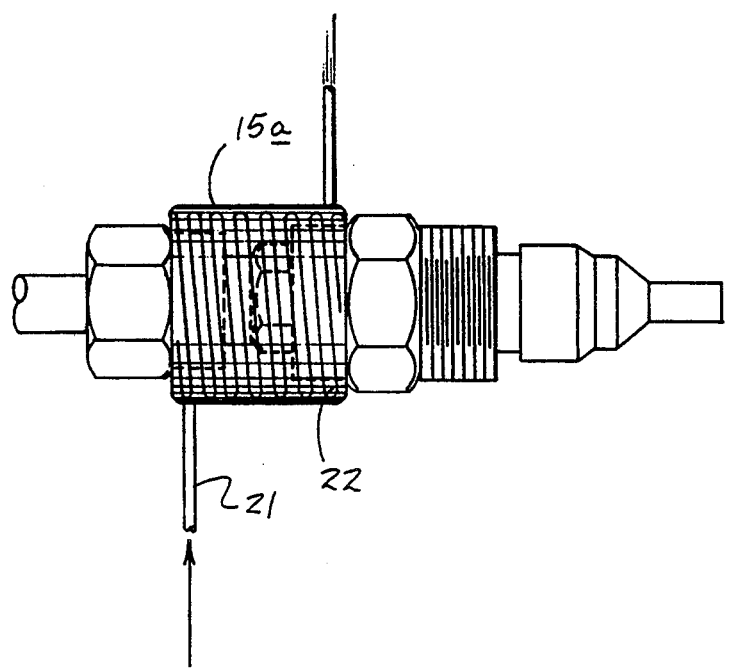
FIG. 4 is an enlarged orthographic view of the fuel injector body as employed in FIG. 3.

The FIG. 3 indicates that a modified jacket 15a is arranged to include a conduit tube 21 coiled about the body 11 within the modified jacket 15a directing heat from an associated vehicular catalytic convertor 24 mounted within the vehicular exhaust pipe conduit 23 to thereby utilize muffled exhaust gas that may be vented directly within the engine compartment or rerouted back to the exhaust pipe 23.

Figure 5:
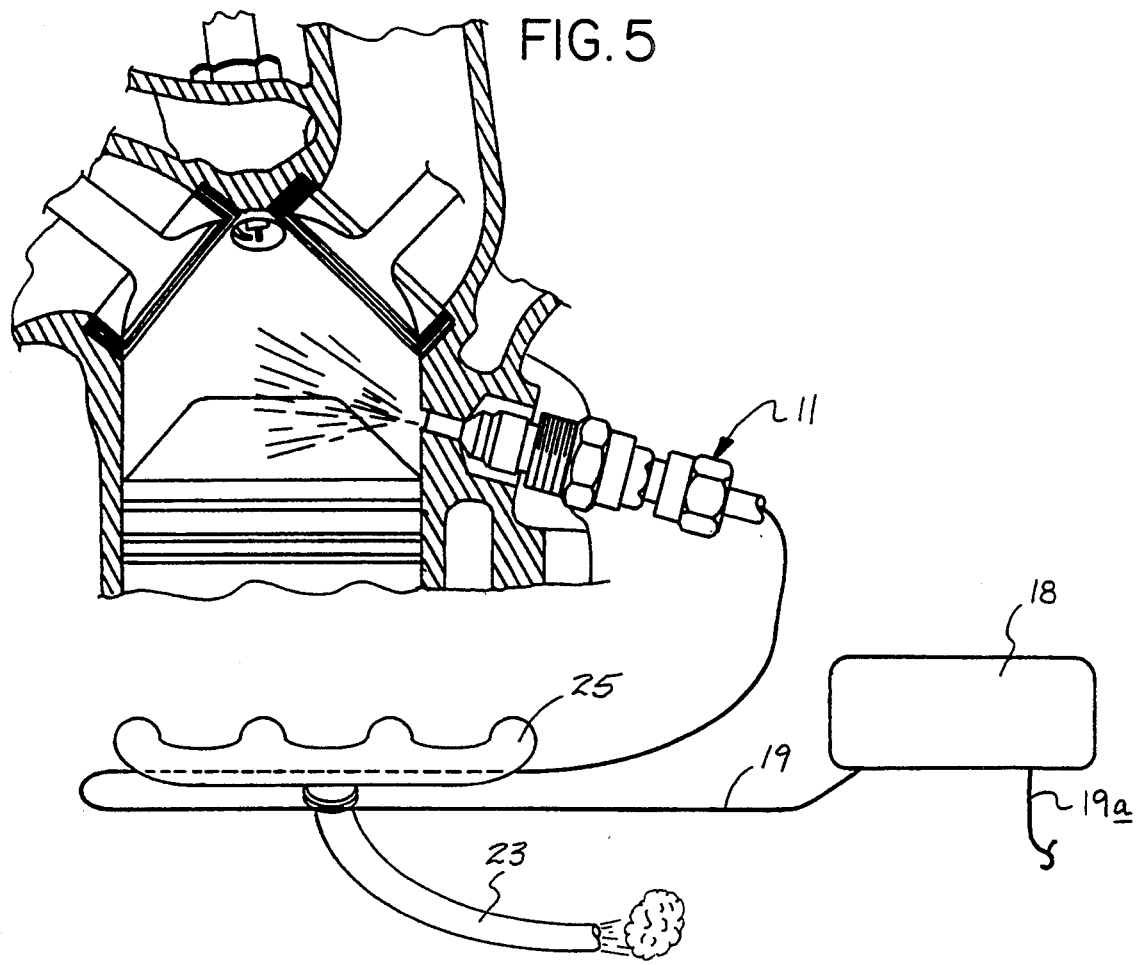
FIG. 5 is an orthographic view of an organization for use by the invention directing fuel through an associated exhaust manifold.

The FIG. 5 indicates use of the fuel supply line 19 directed from the fuel pump 18, that in turn receives fuel from a fuel supply line 19a directing such fuel and heat such fuel as is directed through the exhaust manifold 25 and direct such preheated fuel to the fuel injector body directly.

The FIG. 7 indicates the organization 10a that includes the heating jacket 15, as well as the further heating jacket 15a, as well as employing the preheated fuel through the exhaust manifold 25, in a manner as set forth relative to FIG. 5.

It should be further noted that a plurality of nozzle apertures 26, such as indicated in FIG. 6, are arranged in cooperation with the nozzle outlet port 12a of the nozzle 12 to enhance vaporization of the fuel as the fuel is directed into the combustion chamber under pressure through a matrix of apertures enhancing its vaporization, particularly in combination with the preheating of the fuel injector nozzle body as well as the fuel.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vaporized fuel injection system arranged for preheating fuel directed into a combustion chamber of an internal combustion engine, wherein the system comprises, a fuel injector device having an elongate body, and a nozzle arranged for projection within the combustion chamber, and a heating jacket arranged in surrounding relationship relative to the body, with a coiled electrical resistance cable directed through the heating jacket in outer communication with a vehicular battery to effect heating of the body of the fuel injector device, and a further heating jacket mounted in surrounding relationship relative to the body adjacent to the heating jacket, wherein the further heating jacket includes a coiled conduit tube directed therethrough, and an exhaust conduit, the exhaust conduit having a catalytic convertor with the exhaust conduit arranged in operative communication with an exhaust manifold, the exhaust manifold arranged in securement with the internal combustion engine, and wherein the exhaust conduit is arranged in operative communication with the catalytic convertor to direct heated exhaust gas from said catalytic convertor through said further heating jacket.

2. A system as set forth in claim 1 further including fuel supply line directed to the body, and the fuel supply line is directed through the exhaust manifold for preheating fuel directed through said fuel supply line.

3. A system as set forth in claim 2 further including the nozzle including a nozzle outlet port and a plurality of nozzle apertures directed through the nozzle adjacent to the outlet port.

* * * * *